(12) United States Patent
Bittner et al.

(10) Patent No.: US 12,221,821 B2
(45) Date of Patent: Feb. 11, 2025

(54) DRIVE FOR A FLAP

(71) Applicant: U-SHIN DEUTSCHLAND ZUGANGSSYSTEME GMBH, Erdweg (DE)

(72) Inventors: Eric Bittner, Erdweg (DE); Armin Dietl, Erdweg (DE); Yvan Sierp, Erdweg (DE); Martin Winker, Erdweg (DE); Nicolai Deutschmann, Erdweg (DE)

(73) Assignee: U-SHIN DEUTSCHLAND ZUGANGSSYSTEME GMBH (DE)

( * ) Notice: Subject to any disclaimer, the term of this patent is extended or adjusted under 35 U.S.C. 154(b) by 169 days.

(21) Appl. No.: 17/955,409

(22) Filed: Sep. 28, 2022

(65) Prior Publication Data

US 2023/0101330 A1 Mar. 30, 2023

(30) Foreign Application Priority Data

Sep. 29, 2021 (DE) .................. 10 2021 125 312.8
Sep. 5, 2022 (DE) .................. 10 2022 122 464.3

(51) Int. Cl.
*E05F 15/622* (2015.01)
*E05F 5/00* (2017.01)
*E05F 15/41* (2015.01)
*F16H 25/20* (2006.01)

(52) U.S. Cl.
CPC ............ *E05F 15/622* (2015.01); *E05F 15/41* (2015.01); *F16H 25/2021* (2013.01); *E05F 5/00* (2013.01); *E05Y 2201/21* (2013.01); *E05Y 2201/41* (2013.01); *E05Y 2201/422* (2013.01); *E05Y 2201/604* (2013.01); *E05Y 2201/696* (2013.01); *F16H 2025/2084* (2013.01)

(58) Field of Classification Search
CPC ........ F16H 2025/2084; F16H 2025/204; E05F 15/622
See application file for complete search history.

(56) References Cited

U.S. PATENT DOCUMENTS

| 5,809,833 | A | * | 9/1998 | Newport | ................. F16H 25/20 74/89.41 |
| 7,681,469 | B2 | | 3/2010 | Ritter | |
| 10,501,109 | B2 | | 12/2019 | Kato | |
| 10,683,691 | B2 | | 6/2020 | Podkopayev | |

(Continued)

FOREIGN PATENT DOCUMENTS

| DE | 102005025748 A1 | 12/2006 |
| DE | 102005030052 A1 | 12/2006 |

(Continued)

*Primary Examiner* — Jake Cook
(74) *Attorney, Agent, or Firm* — Dilworth IP, LLC

(57) ABSTRACT

A drive for a flap, wherein the drive has a housing, a motor and a spindle drive, wherein the motor and the spindle drive are drivingly connected to one another and make a motorized adjustment of the flap possible, wherein the drive moves the flap at least into an open position and a closed position, wherein the spindle drive has a threaded spindle with a nut and a thrust tube and the thrust tube is connected to the threaded spindle via the nut, wherein the thrust tube is moved via a translational movement, wherein the spindle drive is arranged inside a rotor and the motor drives the rotor, wherein the rotor is connected to the threaded spindle.

23 Claims, 8 Drawing Sheets

(56) References Cited

U.S. PATENT DOCUMENTS

| | | |
|---|---|---|
| 2007/0062119 A1 | 3/2007 | Ritter |
| 2016/0047446 A1 | 2/2016 | Hung |
| 2017/0292311 A1 | 10/2017 | Podkopayev |
| 2018/0141581 A1 | 5/2018 | Kato |
| 2020/0087965 A1 | 3/2020 | Battlogg |
| 2020/0164457 A1 | 5/2020 | Rosengren et al. |
| 2020/0291710 A1 | 9/2020 | Kummer et al. |
| 2020/0370357 A1 | 11/2020 | Schmengler et al. |
| 2021/0238901 A1 | 8/2021 | Battlogg |
| 2021/0270076 A1 | 9/2021 | Neundorf |
| 2022/0243792 A1 * | 8/2022 | Varga .................. F16H 25/20 |

FOREIGN PATENT DOCUMENTS

| | | |
|---|---|---|
| DE | 202015104152 U1 | 10/2015 |
| DE | 102017205605 A1 | 10/2017 |
| DE | 102017127566 A1 | 5/2018 |
| DE | 102017128392 A1 | 6/2019 |
| DE | 102018117413 A1 | 1/2020 |
| DE | 112019005887 T5 | 8/2021 |
| FR | 2599072 A1 | 11/1987 |
| WO | 2013004702 A1 | 1/2013 |
| WO | 2013013313 A1 | 1/2013 |
| WO | 2018215342 A1 | 11/2018 |
| WO | 2019138068 A1 | 7/2019 |
| WO | 2019194143 A1 | 10/2019 |
| WO | 2020016300 A1 | 1/2020 |
| WO | 2021081664 A1 | 5/2021 |

* cited by examiner

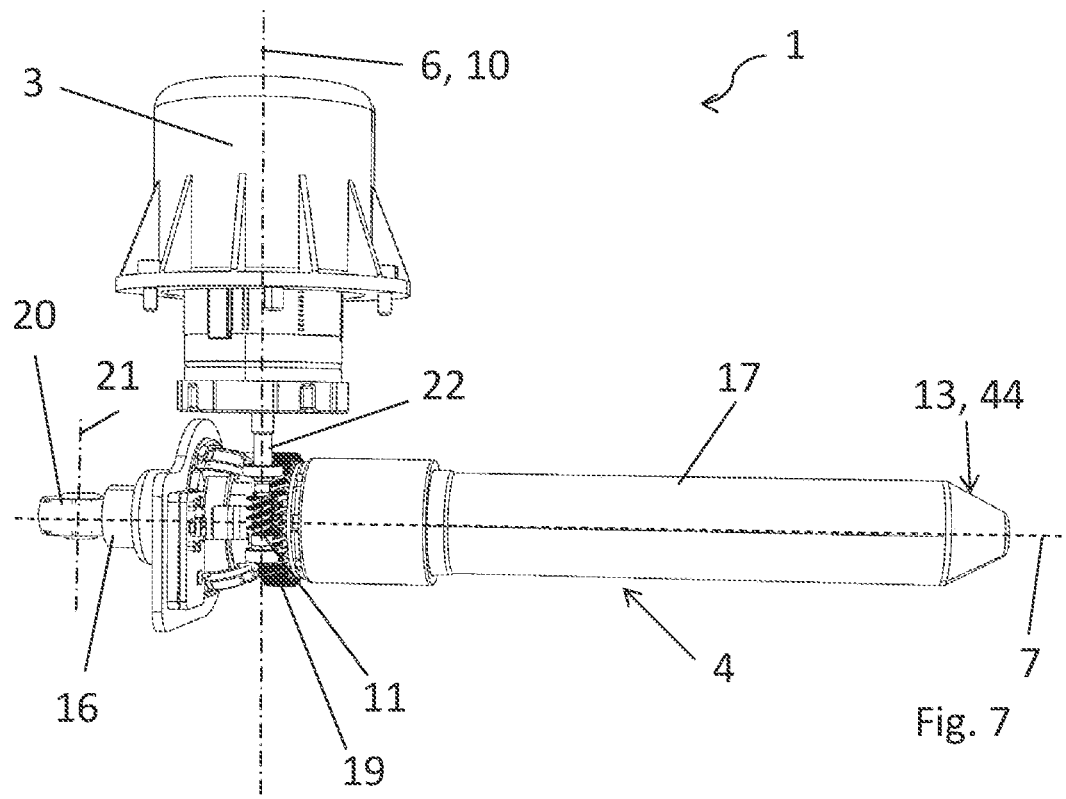
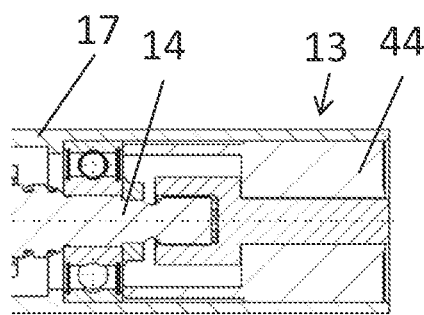
Fig. 8a
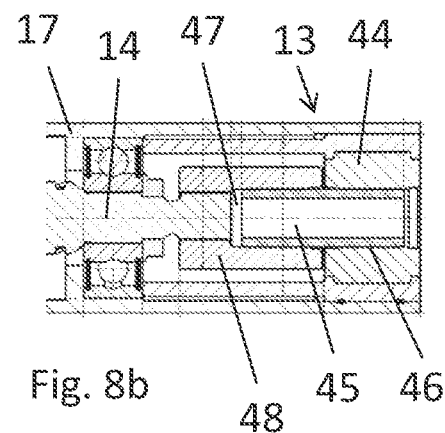
Fig. 8b

DRIVE FOR A FLAP

FIELD OF THE INVENTION

The disclosure relates to a drive for a flap, wherein the drive has a housing, a motor and a spindle drive, wherein the motor and the spindle drive are drivingly connected to one another and make a motorized adjustment of the flap possible, wherein the drive moves the flap at least into an open position and a closed position, wherein the spindle drive has a threaded spindle with a nut and a thrust tube and the thrust tube is connected to the threaded spindle via the nut, wherein the thrust tube is moved via a translational movement.

BACKGROUND

The drive according to the disclosure can be utilized for the adjustment of a large number of different flaps of a vehicle. Thus, by the term "flap" is meant both a tailgate, a boot lid or a bonnet and a side door, a sliding door or a load compartment floor.

Corresponding drives for flaps are known from the state of the art. For example, DE 10 2018 117 413 A1 discloses a corresponding drive with a spindle/spindle nut gearbox. The drive is pivotably arranged on a flap and pivotably connected to a vehicle body.

A disadvantage of this drive is the large installation space requirement, since drives of this type are also installed in side doors, in which very limited space is available and very high demands are placed on the drives, in particular on the visual appearance thereof, the acoustic noticeability and the sealing of the drives from environmental influences, such as for example water entering the door.

The object of the disclosure is therefore to overcome the known disadvantages and, in this way, improve the known drives.

SUMMARY

This object is achieved in the case of a drive of the type named at the beginning in that the spindle drive is arranged inside a rotor and the motor drives the rotor, wherein the rotor is connected to the threaded spindle, in particular the rotor is connected to the threaded spindle in a rotationally fixed manner. The rotor is preferably connected to the threaded spindle via an adapter, in particular the rotor is connected to the threaded spindle via the adapter in a rotationally fixed manner. For this, the rotor can have a hollow cylindrical geometry. The threaded spindle and the thrust tube are thereby surrounded by the rotor radially, wherein the thrust tube can be moved out of the rotor and the thrust tube can also be moved into the rotor again. Thus, the rotor is sealed on one end face, in particular sealed in a water-tight manner, and on the opposite end face the rotor has an opening, from which at least the thrust tube can protrude.

In a further design, the spindle drive can protrude from the housing at least partially. The housing thereby has smaller dimensions in the direction of the spindle drive, as a result of which the housing requires less installation space.

In a further design, at least one bearing is arranged between the housing and the rotor. As a result, the rotor is arranged rotatable in the housing and can rotate independently of the housing.

In a further design, a gear wheel or a spur gear is connected to the rotor, in particular the gear wheel or the spur gear is connected to the rotor in a rotationally fixed manner. The gear wheel or the spur gear and the rotor are preferably formed in one piece. Because of this gear wheel, the rotational movement of the motor can be transmitted to the rotor. For this, the motor output shaft and the gear wheel of the rotor are preferably arranged inside the housing.

In a further design, the motor and the spindle drive are drivingly connected via a first gear stage, in particular a worm gear mechanism, wherein the first gear stage drives the rotor. In particular, via the first gear stage, in particular the worm gear mechanism, the motor drives a second gear stage, in particular a spur gear mechanism, which in turn drives the rotor. The spur gear thus transmits the torque to the gear wheel or to the spur gear of the rotor, which is connected to the rotor in a radially and axially fixed manner, in particular in a rotationally fixed manner. In other words, the motor drives the rotor via at least one gear stage, preferably via two gear stages. The adapter is connected to the rotor, in particular connected in a rotationally fixed manner, and transmits the torque from the rotor to the threaded spindle. The adapter and the rotor are preferably formed in one piece. The rotor and the threaded spindle are fixedly connected to one another. A rotational movement of the spindle thus results.

An Oldham coupling and/or a flexible shaft is preferably arranged between the motor and the first gear stage, in particular the worm gear mechanism. A misalignment between the motor output shaft and the first gear stage can thereby be compensated for. Alternatively, a rigid shaft can be arranged between the motor and the first gear stage, in particular the worm gear mechanism.

Furthermore, the first gear stage, in particular the worm gear mechanism, and the second gear stage, in particular the spur gear mechanism, are connected by means of an overload clutch. In the case of incorrect use, for example by abruptly pulling on the vehicle door against the electrical opening or closing movement, the force flow between the worm gear mechanism and the spur gear mechanism is interrupted. The spur gear and the worm gear can thereby slide through against one another, and the incorrect use does not lead to destruction of the drive, in particular the spur gear or the worm gear.

Alternatively, in the case of the use of only one gear stage, in particular a worm gear mechanism which drivingly connects the motor to the spindle drive, an overload clutch can be arranged on the rotor. Due to this design with only one gear stage, the dimensions of the drive can be further reduced. For this, an adapter can be fixedly connected to the rotor. For example, spring plates can be fixed in the adapter in a positive-locking manner so as to be rotationally fixed. The spring plates are mounted on the threaded spindle with a defined preloading and the adapter is mounted rotatable on the threaded spindle. In addition, a retaining ring, which prevents an axial displacement between the threaded spindle and the adapter, can be provided on the adapter. If a certain torque is exceeded or if a load peak acts on the system, the spring plates and the threaded spindle can slide through against one another.

Furthermore, it is also possible for a spring pin to act as overload clutch instead of spring plates. For this, a receiving hole for the spring pin is made in the adapter. The adapter can be realized in one piece from hardened steel or from plastic with a hardened insert. One side of the spring pin is pressed into the receiving hole of the adapter. The other side of the spring pin is pressed into a receiving hole of the threaded spindle. A torque can thereby be transmitted from the adapter via the spring pin onto the threaded spindle. This occurs via the frictional locking between the adapter and the spring pin as well as via the frictional locking between the threaded spindle and the spring pin. If a certain torque is exceeded or if a load peak acts on the system, the adapter, the spring pin and/or the threaded spindle can slide through against one another. In order to minimize the friction in the axial direction, an axial bearing can be provided on the threaded spindle. An axial securing can be realized via retaining washers, which are arranged between the adapter and the threaded spindle. In a further design, the spindle drive additionally has a guide tube, via which a torque support of the thrust tube is effected. For this, the guide tube can be connected to a housing cover, in particular connected in a rotationally fixed manner. The guide tube and the housing cover can preferably be formed in one piece. The housing cover seals an opening in the housing. Thus, the thrust tube is connected to the threaded spindle via the nut or an internal thread. The rotational movement of the motor can thereby be converted into a translational movement. In order to make this possible, the torque on the thrust tube is supported on the guide tube, which is connected to the housing in a rotationally fixed manner via the housing cover. The housing cover and the guide tube can also be formed in one piece.

In a further design, at one end of the thrust tube a connecting point is arranged, which is connected to a vehicle body, wherein the thrust tube and the connecting point are connected to one another, in particular the thrust tube and the connecting point are fixedly connected in the axial direction and/or the thrust tube and the connecting point are connected in a rotationally fixed manner. The connecting point can be formed in particular as a ball joint or as a through-hole. Furthermore, the connecting point can also provide a torque support for the thrust tube. The connecting point is preferably pivotable about a pivot axis, wherein the pivot axis of the connecting point runs parallel to the axis of rotation of the motor. Alternatively, the pivot axis of the connecting point and the axis of rotation of the motor can have exactly one intersection. The pivot axis of the connecting point and the axis of rotation of the motor can thus be arranged at an angle to one another.

In a further design, the drive is fastened to the flap via a holder. The housing is preferably held in the holder via at least two bearing points, wherein one bearing point can be arranged close to the motor, in particular between the motor and the spindle drive, and a further bearing point can be arranged on the opposite side of the spindle drive in the axial direction of the first bearing point. Furthermore, the holder can have a U-shaped geometry in cross section. As a result, the housing is pivotably mounted in the holder and the holder is screwed firmly to the flap, in particular screwed to the inside of a door.

In a further design, an axis of rotation of the motor and an axis of rotation of the spindle drive are arranged skewed relative to one another. Thus, the axis of rotation of the motor and the axis of rotation of the spindle drive are not parallel to one another and have an angle greater than 0° relative to one another. The axis of rotation of the motor and the axis of rotation of the spindle drive are preferably arranged at an angle of between 30° and 90° relative to one another, the axis of rotation of the motor and the axis of rotation of the spindle drive are particularly preferably arranged orthogonal to one another. Alternatively, the axis of rotation of the motor and the axis of rotation of the spindle drive can have exactly one intersection. Furthermore, the drive can be mounted pivotable about a pivot axis, wherein the pivot axis preferably runs parallel to the axis of rotation of the motor. A pivoting movement of the drive relative to the flap is thereby made possible. Alternatively, according to the installation conditions, the pivot axis can run skewed relative to the axis of rotation of the motor or the pivot axis and the axis of rotation of the motor have exactly one intersection.

In a further design, arranged on the rotor there is a coding disc, which is scanned by a sensor which is arranged inside the housing. The coding disc can be both magnetic and an optical coding disc, wherein the coding disc has a coding, which can be scanned by the sensor and an angle of rotation can thereby be determined. A rotary encoder is thus arranged on the rotor. The sensor can determine the angle of rotation in absolute or relative terms. An incremental rotary encoder is particularly preferably used.

Alternatively, for example a sensor, in particular an incremental sensor, can be provided for determining the angle of rotation, wherein the coding disc or coding, in particular a magnetic disc, is fixedly connected to the threaded spindle. The material of the thrust tube is preferably not ferromagnetic, with the result that shielding of a magnetic field is not possible. The sensor is preferably fastened on or in the housing. The incremental sensor can detect the change in polarity of the magnetic disc and thus determine the angle of rotation of the threaded spindle. In a further design, at least in each case one seal is arranged between the thrust tube and the housing and between the rotor and the housing. The seal of the thrust tube can additionally have a wiper or a wiping effect, with the result that possible contamination cannot enter the housing. Furthermore, a soiling of the functional surfaces of the threaded spindle is thereby ruled out and the drive is protected against the ingress of water or contamination.

In a further design, a hysteresis brake can be arranged between the motor and the spindle drive. Due to the hysteresis brake, the axis of rotation of the motor can be braked, as a result of which the flap, in particular the vehicle door, can be held in all positions and vehicle positions.

In a further design, a sensor which detects a pivoting angle of the drive can be arranged in immediate proximity to the drive or on the drive or on or in the housing of the drive. A coding, which is scanned by the sensor and can thereby detect a pivoting angle of the drive, is preferably arranged on the drive. The coding is preferably arranged on the motor or on a housing of the motor, in particular the coding extends at least partially over the outer circumference of the motor or of the housing of the motor. The coding can thus extend only over the region of the motor or of the housing of the motor which corresponds to the maximum pivoting angle of the drive. In particular, the sensor is arranged on the holder. The coding can be applied to a code disc or coding disc, for example, which is arranged on the motor or on the housing of the motor, or be applied directly to the motor or to the housing of the motor. Furthermore, the coding can be arranged on the motor or the housing of the motor in the form of a tooth system, for example, in particular the tooth system and the housing of the motor can be formed in one piece. The sensor can be a magnetic sensor, an optical sensor, an inductive sensor or a capacitive sensor. The coding is also formed corresponding to the functional principle of the sensor.

Alternatively, the coding can also be arranged on the holder and the sensor can be arranged on or in the housing of the motor.

It is preferably an incremental sensor, with which the markings or codings are counted, or an absolute sensor, which has a coding which precisely defines the pivoting angle. An absolute position of the drive can thereby be determined and compared with the position of the spindle drive. For example, after a power cut, the position of the spindle drive can thereby be determined without a reference run of the spindle drive being necessary.

Furthermore, a magnet can be arranged on the holder, which moves over a sensor accommodated in the housing, wherein the sensor can be a 2D or 3D Hall sensor, for example.

Due to the sensor and the coding, the current pivoting angle of the drive and thus also the current pivoting angle of the flap can be detected. With the aid of further sensors, an obstacle detection and an unintentional door movement can thereby be detected, for example. For example, for an obstacle detection, the pivoting angle and a torque of the drive can be determined and, as soon as the torque exceeds a threshold value, the pivoting of the flap can be interrupted.

BRIEF DESCRIPTION OF THE DRAWINGS

Further features and advantages of the disclosure are revealed by the following description and the attached drawings, to which reference is made below. In the drawings, there are shown in:

FIG. 7 is a perspective view of a drive according to the disclosure with a gear stage, FIGS. 8a-8f in each case show a cross section through a part of the drive from FIG. 7 with different designs of the overload clutch.

DETAILED DESCRIPTION

Figure 1:
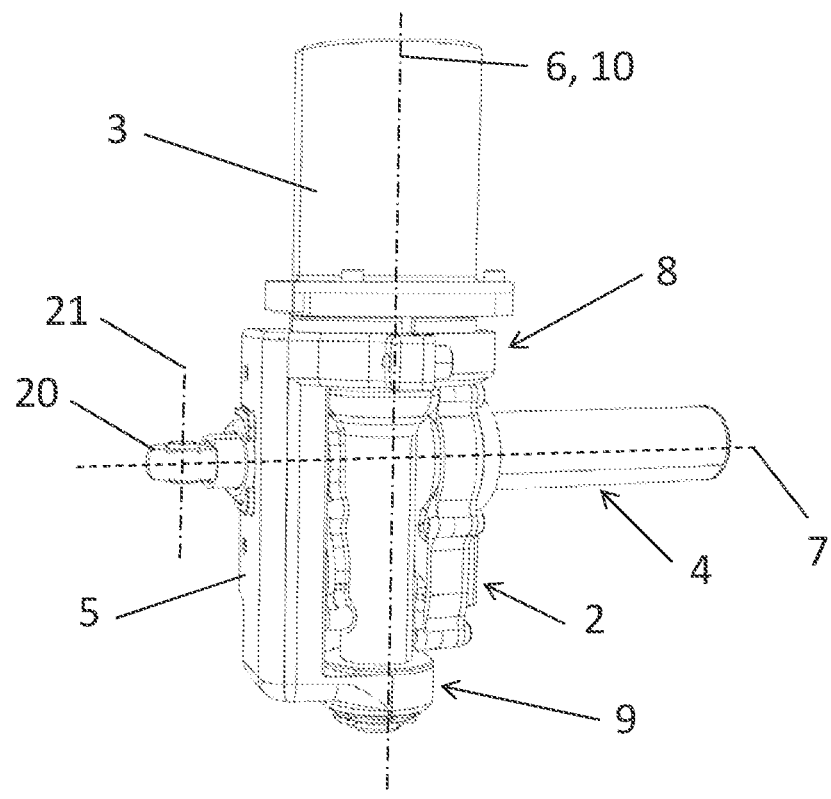
FIG. 1 is a perspective view of a drive according to the disclosure.

FIG. 1 shows a perspective view of a drive 1 according to the disclosure for a flap, wherein the drive 1 has a housing 2, a motor 3 and a spindle drive 4, wherein the motor 3 and the spindle drive 4 are drivingly connected to one another and make a motorized adjustment of the flap possible, wherein the drive 1 moves the flap at least into an open position and a closed position. For fastening the drive 1 on or in a flap, a holder 5 is provided, which receives the drive 1. Furthermore, an axis of rotation 6 of the motor 3 and an axis of rotation 7 of the spindle drive 4 are arranged orthogonal to one another. The holder 5 makes it possible for the drive 1 to pivot as the drive 1 is pivotably mounted in the holder by a first bearing point 8 and by a second bearing point 9. The bearing points 8, 9 are preferably sliding bearings, which are arranged between the housing 2 and the holder 5. Thus, the drive 1 has a pivot axis 10 which runs parallel to the axis of rotation 6 of the motor 3. A pivoting movement of the drive 1 relative to the flap is thereby made possible.

Furthermore, at one end of the thrust tube 16 a connecting point 20 is arranged, which is connected to a vehicle body, wherein the thrust tube 16 and the connecting point 20 are fixedly connected to one another in the axial direction and/or the thrust tube 16 and the connecting point 20 are connected to one another in a rotationally fixed manner. The connecting point 20 can be formed in particular as a ball joint or as a through-hole. Furthermore, the connecting point 20 can also provide a torque support for the thrust tube 16. The connecting point 20 is preferably pivotable about a pivot axis 21, wherein the pivot axis 21 of the connecting point 20 runs parallel to the axis of rotation 6 of the motor 3.

Figure 2:
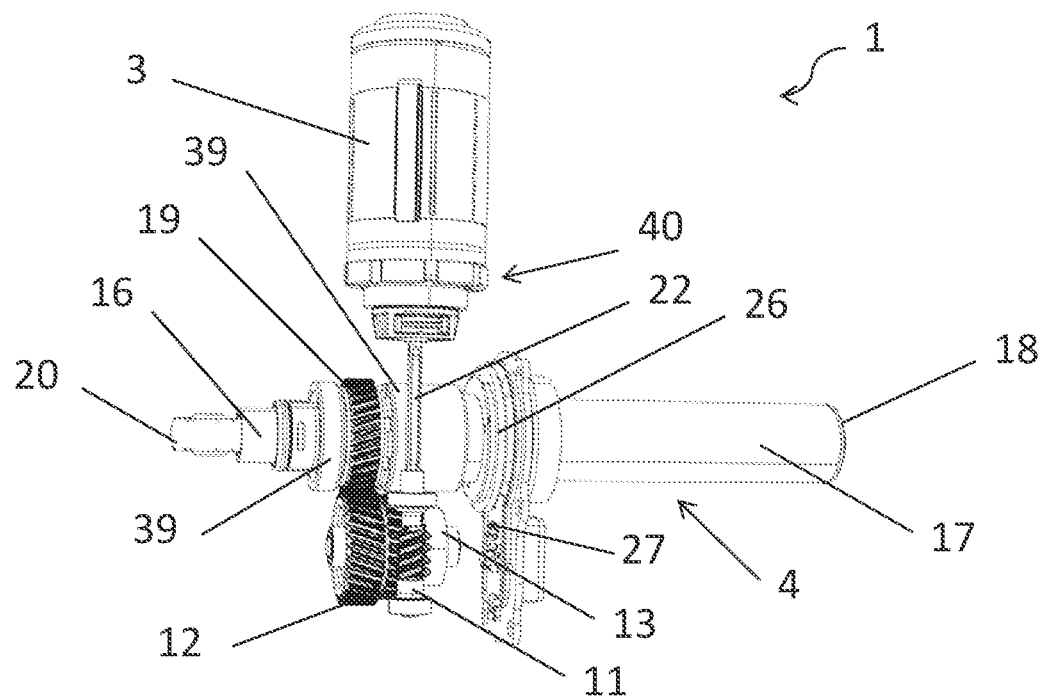
FIG. 2 is a perspective view of the motor, the spindle drive and the gear mechanism.

FIG. 2 shows a perspective view of the motor 3, the spindle drive 4 and the gear stages 11, 12. The motor 3 can, for example, be a brushless motor. The gear stages 11, 12 consist of two gear stages 11, 12, wherein the first gear stage 11 is a worm gear mechanism 11 and the second gear stage 12 is a spur gear mechanism 12. The first gear stage 11 and the second gear stage 12 are connected to one another via an overload clutch 13. The motor 3 can be connected to the first gear stage 11 via a flexible shaft 22 and/or an Oldham coupling is arranged between the motor 3 and the drive shaft 22.

In addition, a hysteresis brake 40 is arranged between the motor 3 and the spindle drive 4. The axis of rotation 6 of the motor 3 can thereby be braked, as a result of which the flap, in particular the vehicle door, can be held in all positions and vehicle positions.

Figure 3:
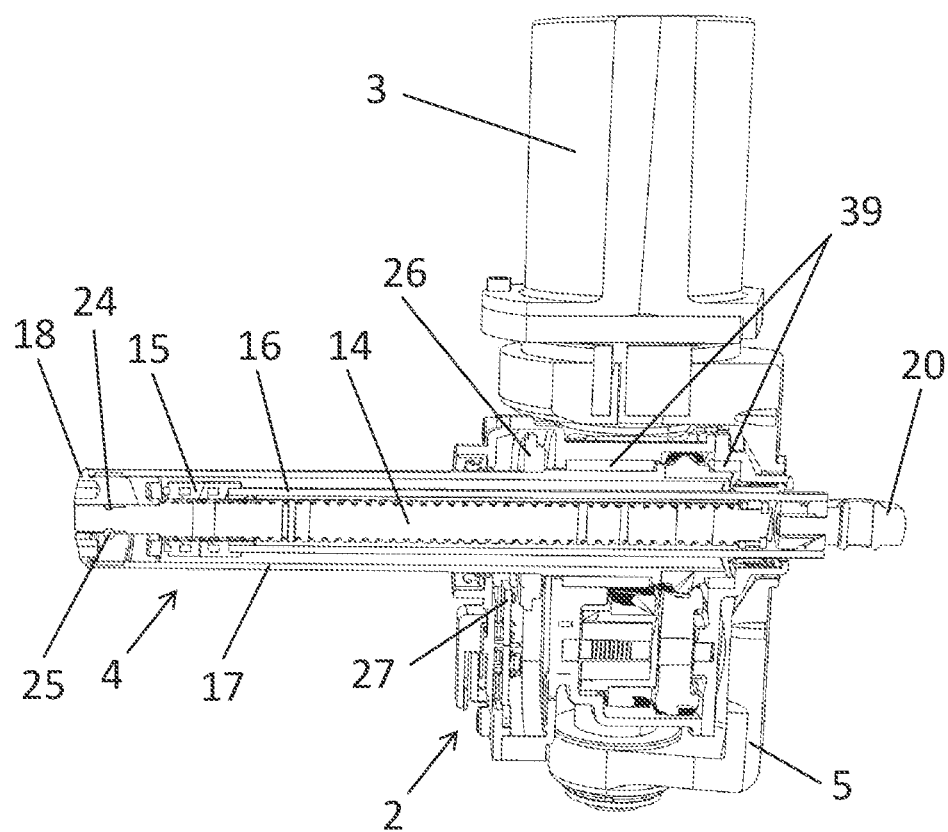
FIG. 3 is a cross section of the spindle drive and of parts of the drive.

FIG. 3 shows a cross section of the spindle drive 4 and a cross section of parts of the drive 1. The spindle drive 4 comprises a threaded spindle 14 with a nut 15 and a thrust tube 16, wherein the thrust tube 16 is connected to the threaded spindle 14 via the nut 15 and the thrust tube 16 is moved via a translational movement. The spindle drive 4 is arranged inside a rotor 17 and the motor 3 drives the rotor 17 via the gear stages 11, 12, wherein the rotor 17 is connected to the threaded spindle 14, in particular in a rotationally fixed manner, and has a hollow cylindrical geometry. For this, a gear wheel 19 or a spur gear 19 is connected to the rotor 17, in particular connected in a rotationally fixed manner. The gear wheel 19 of the rotor 17 is connected to the second gear stage 12 and is driven by it.

Furthermore, the rotor 17 is connected to the threaded spindle 14 via an adapter 18, in particular connected in a rotationally fixed manner. The adapter 18 is arranged on an end face of the rotor 17, wherein the adapter 18 is connected to the rotor 17 in a positive-locking and/or frictional-locking manner. The threaded spindle 14 is likewise connected to the adapter 18 in a positive-locking and/or frictional-locking manner, wherein the threaded spindle 14 preferably has external teeth and the adapter 18 has corresponding internal teeth. As a result, the threaded spindle 14 rotates with the same number of rotations and speed as the rotor 17. In addition, the threaded spindle 14 can have a circumferential groove 24, which is arranged inside the adapter 18. For this, a pin 25, which is connected to the adapter 18, can be arranged in the adapter 18. An additional positional securing of the threaded spindle 14 is thereby effected. Alternatively, the threaded spindle 14 can have an axial securing.

The threaded spindle 14 and the thrust tube 16 are surrounded by the rotor 17 radially, wherein the thrust tube 16 can be moved out of the rotor 17 and the thrust tube 16 can also be moved into the rotor 17 again. Thus, the rotor 17 is sealed on one end face, in particular by the adapter 18, and particularly preferably sealed in a water-tight manner, and on the opposite end face the rotor 17 has an opening, from which at least the thrust tube 16 can protrude.

In order to guarantee a torque support of the thrust tube 16, the thrust tube 16 can have an oval or polygonal geometry and a cutout corresponding to the geometry of the thrust tube 16 can be present in the housing 2 and/or in the holder 5. The cutout in the housing and/or the holder thereby prevents the thrust tube 16 from twisting and thus acts as a torque support. In addition, the connecting point 20 can also provide a torque support for the thrust tube 16 because the connecting point 20 has a connection that is fixed in the axial direction and/or a rotationally fixed connection to the vehicle body, wherein orthogonal to the pivot axis 21 of the connecting point 20 the point of connection 20 to the vehicle body is formed fixed in the axial direction and/or is formed rotationally fixed.

Furthermore, arranged on the rotor 17 there is a coding disc 26, which is scanned by a sensor 27 which is arranged inside the housing 2. The coding disc 26 can be both magnetic and an optical coding disc 26, wherein the coding disc 26 has a coding, which can be scanned by the sensor 27 and an angle of rotation can thereby be determined. The sensor 27 can determine the angle of rotation in absolute or relative terms.

Two bearing points 39 are provided inside the housing 2 for mounting the rotor 17.

Figure 4:
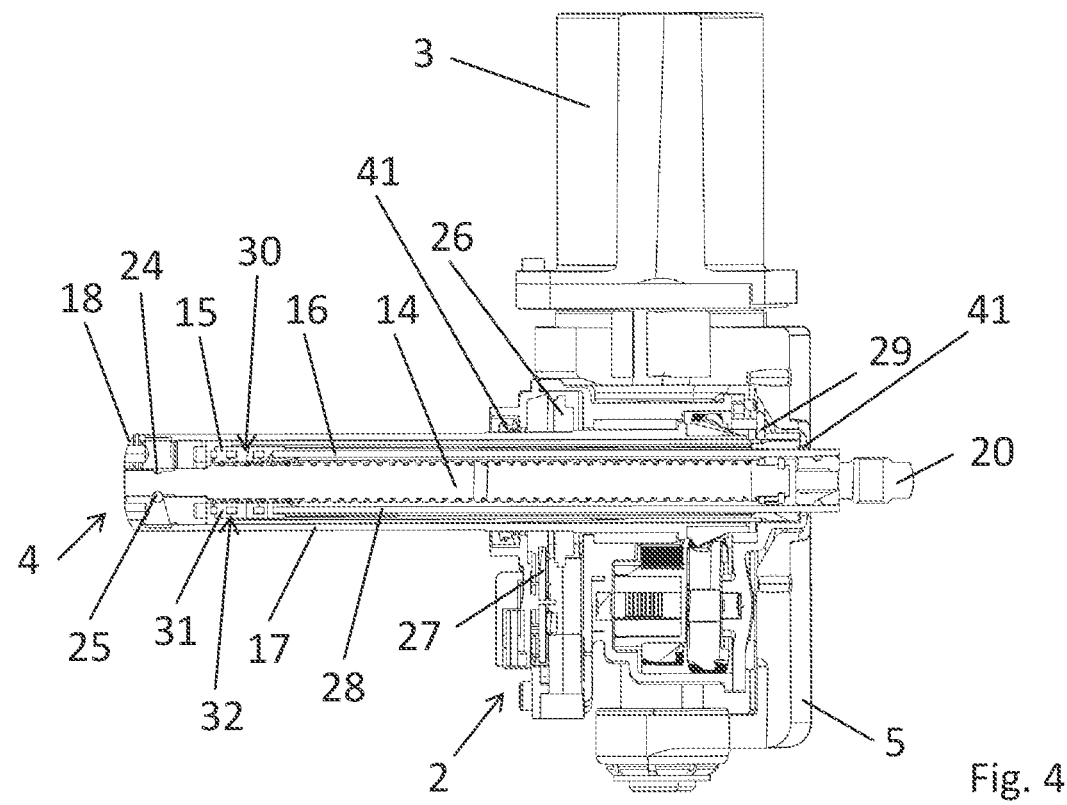
FIG. 4 is a cross section according to FIG. 3 with an additional guide tube.

FIG. 4 shows a cross section according to FIG. 3 with an additional guide tube 28. The guide tube 28 is arranged between the thrust tube 16 and the rotor 17. Thus, in this embodiment example, the spindle drive 4 consists of the threaded spindle 14 with the nut 15, the thrust tube 16 and the guide tube 28, wherein the guide tube 28 acts as torque support for the thrust tube 16. For this, the guide tube 28 is connected to a housing cover 29, in particular connected in a rotationally fixed manner. The housing cover 29 seals an opening in the housing 2. Thus, the thrust tube 16 is connected to the threaded spindle 14 via the nut 15 or an internal thread. The rotational movement of the motor 3 can thereby be converted into a translational movement. In order to make this possible, the torque on the thrust tube 16 is supported on the guide tube 28, which is connected to the housing 2 in a rotationally fixed manner via the housing cover 29. The housing cover 29 and the guide tube 28 can also be formed in one piece.

The nut 15 is preferably manufactured from plastic. Advantageously, the nut 15 is manufactured and fitted directly on the thrust tube 16 by injection through openings. A stable and hard-wearing connection between the thrust tube 16 and the nut 15 is thereby produced. Advantageously, the nut 15 has, in the longitudinal direction, in each case two holding extensions, connected via a bridge, which engage in two openings in the thrust tube 16 lying one behind the other in the longitudinal direction. An optimum hold is thus provided.

According to the disclosure, the nut 15 is manufactured from plastic. Openings 30 are provided on the outer circumference on the thrust tube 16 for holding the nut 15 on the thrust tube 16. Advantageously, four pairs of openings 30 are provided distributed at regular intervals over the circumference, wherein the openings 30 of a pair lie one behind the other in the longitudinal direction of the thrust tube 16. Alternatively, several openings 30, lying one behind another in the longitudinal direction, and associated holding extensions 31, connected in each case via a bridge 32, can also be provided, with the result that the holding forces for each holding extension 31 are reduced and risks in the case of a possible fracture of an individual holding extension 31 can also be guarded against even more efficiently.

In a further alternative embodiment, it is also possible to provide only at least two, preferably four, openings 30 distributed at regular intervals over the circumference. A bridge 32 is formed between two holding extensions 31 in that the nut 15 protrudes beyond an end face of the thrust tube 16 and this protrusion forms a first holding extension 31 and the bridge 32 is effected between this protrusion of the nut 15 and the holding extension 31 which protrudes through the opening 30.

Due to the holding extensions 31 and the bridges 32 connected thereto, which protrude beyond the thrust tube 16, the bridges 32 can engage in corresponding grooves in the guide tube 28 and thereby effect a torque support of the thrust tube 16.

Furthermore, a seal 41 is arranged in each case between the thrust tube 16 and the housing 2 and between the rotor 17 and the housing 2.

Figure 5:
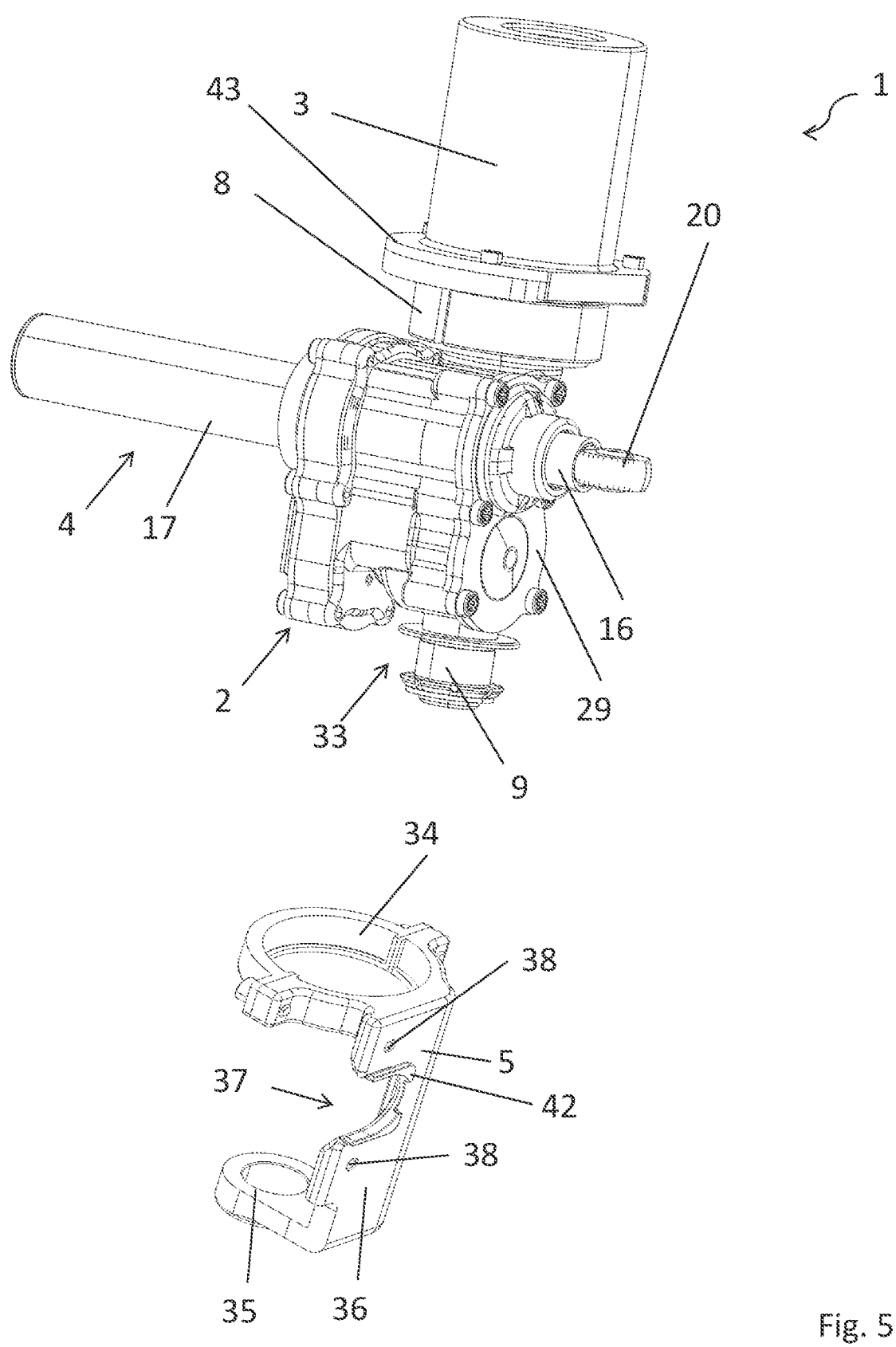
FIG. 5 is a perspective view of the holder and of the drive.

FIG. 5 shows a perspective view of the holder 5 and of the drive 1. The holder 5 encircles the housing 2 below the motor 3 and below the spindle drive 4 and, respectively, in the axial direction of the first bearing point 8 on the opposite side of the spindle drive 4. For this, an extension 33 is moulded on the housing 2. In the region in which the holder 5 encircles the housing 2, the housing 2 has a cylindrical geometry. Furthermore, in each case at least one bearing 8, 9 is arranged in these regions. The holder 5 has a U-shaped geometry in cross section, which consists of two receivers 34, 35 and the two receivers 34, 35 are connected to one another via a connecting web 36.

In the region below the motor 3, the holder 5 has a first hollow cylindrical receiver 34, which is preferably designed in two parts. Each part forms a semi-circle. After the drive 1 has been inserted, the two parts can be connected to one another in a frictional-locking, positive-locking and/or material-bonding manner, in particular the two parts can be screwed or welded. A second hollow cylindrical receiver 35, into which the housing 2 is inserted, is arranged below the spindle drive 4 and, respectively, in the axial direction of the first bearing point 8 on the opposite side of the spindle drive 4.

The connecting web 36 has a cutout 37 for the thrust rod 16 and the connecting point 20. The dimensions of the cutout 37 are contoured such that the drive 1 can pivot. In order to facilitate the assembly of the drive 1 and the holder 5, it is advantageous if the cutout 37 is a U-shaped cutout 37 and is thus open to one side of the holder 5. The connecting web 36 can also thereby be constructed with a smaller width. Furthermore, a centring device 42 can be arranged on the cutout 37 because a projecting edge 42 is arranged on the outer circumferential edge of the cutout 37. At least two drilled holes 38, through which the holder 5 is screwed to the flap, are arranged on the connecting web 36. In addition, at least one centring device, which makes it easier to position the drive 1, can be provided on the connecting web 36. The centring device can be designed in the form of a cone, for example, which is introduced into corresponding recesses in the flap.

In addition, instead of the drilled holes 38, stud bolts can also be arranged on the connecting web 36 or stud bolts can be arranged on the holder 5 and the holder 5 is connected to the flap via the stud bolts. The stud bolts provide both a guiding and a centring, and an additional centring device is not needed.

Figure 6:
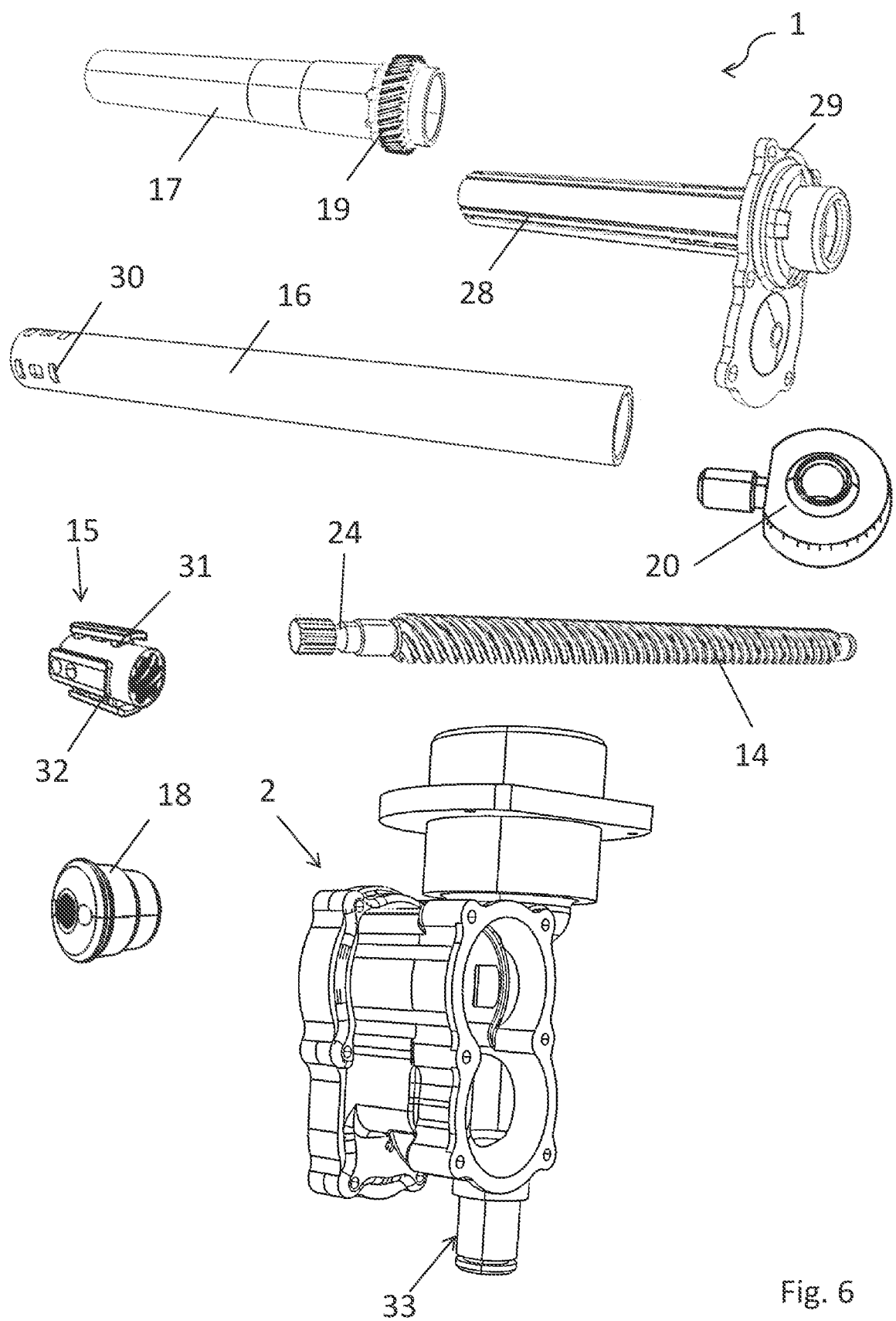
FIG. 6 is a perspective view of selected components of the drive.

In addition, a sensor which detects a pivoting angle of the drive 1 can be arranged in immediate proximity to the drive 1. A coding disc, which is scanned by the sensor and can thereby detect a pivoting angle of the drive 1, is preferably arranged on the drive 1. The coding disc is preferably arranged on the motor 3 or on a housing of the motor 3. Particularly preferably, the coding disc is fastened to a flange 43 of the motor 3 or of the housing of the motor 3 and the sensor is arranged on the holder 5. FIG. 6 shows a perspective view of selected components of the drive 1. Here, the rotor 17 is depicted with the gear wheel 19, wherein the rotor 17 surrounds the thrust tube 16 and the threaded spindle 14 with nut 15 radially. In addition, a guide tube 28 can be arranged between the thrust tube 16 and the rotor 17. The guide tube 28 is connected to the housing cover 29 and thus seals an opening in the housing 2. Furthermore, the openings 30 in the thrust tube 16 are represented, as well as the nut 15 in detail, with the holding extensions 31 and the bridge 32. Furthermore, the housing 2 and the adapter 18 are represented.

FIG. 7 shows a perspective view of a drive 1 according to the disclosure with only one gear stage 11, wherein the drive 1 has a housing 2 that is not shown, a motor 3 and a spindle drive 4, corresponding to FIG. 1. The motor 3 and the spindle drive 4 are drivingly connected to one another. For fastening the drive 1 on or in a flap, a holder 5 that is not shown is provided, which receives the drive 1. Furthermore, an axis of rotation 6 of the motor 3 and an axis of rotation 7 of the spindle drive 4 are arranged orthogonal to one another.

Furthermore, at one end of the thrust tube 16 a connecting point 20 is arranged, which is connected to a vehicle body, wherein the thrust tube 16 and the connecting point 20 are connected to one another fixedly in the axial direction and/or the thrust tube 16 and the connecting point 20 are connected to one another in a rotationally fixed manner. The connecting point 20 can be formed in particular as a ball joint or as a through-hole. Furthermore, the connecting point 20 can also provide a torque support for the thrust tube 16. The connecting point 20 is preferably pivotable about a pivot axis 21, wherein the pivot axis 21 of the connecting point 20 runs parallel to the axis of rotation 6 of the motor 3.

The motor 3 can, for example, be a brushless motor. The gear stage 11 preferably consists of a worm gear mechanism 11. The gear stage 11 is connected to the gear wheel 19 of the rotor 17 and is driven by it. The motor 3 can be connected to the first gear stage 11 via a flexible shaft 22 and/or an Oldham coupling is arranged between the motor 3 and the drive shaft 22.

In addition, a hysteresis brake 40 is arranged between the motor 3 and the spindle drive 4. The axis of rotation 6 of the motor 3 can thereby be braked, as a result of which the flap, in particular the vehicle door, can be held in all positions and vehicle positions.

In addition, an overload clutch 13 is arranged on the rotor 17. This consists of an adapter 44 which is fixedly connected, in particular in a rotationally fixed manner, to the rotor 17. For example, spring plates can be fixed in the adapter 44 in a positive-locking manner so as to be rotationally fixed. The spring plates are mounted on the threaded spindle 14 with a defined preloading and the adapter 44 is mounted rotatable on the threaded spindle 14. In addition, a retaining ring, which prevents an axial displacement between the threaded spindle 14 and the adapter 44, can be provided on the adapter 44. If a certain torque is exceeded or if a load peak acts on the system, the spring plates and the threaded spindle 14 can slide through against one another.

Furthermore, it is also possible for a spring pin to act as overload clutch 13 instead of spring plates. For this, a receiving hole for the spring pin is made in the adapter 44. The adapter 44 can be realized in one piece from hardened steel or from plastic with a hardened insert. One side of the spring pin is pressed into the receiving hole of the adapter 44. The opposite side of the spring pin is pressed into a receiving hole of the threaded spindle 14. A torque can thereby be transmitted from the adapter 44 via the spring pin onto the threaded spindle 14. This occurs via the frictional locking between the adapter 44 and the spring pin as well as via the frictional locking between the threaded spindle 14 and the spring pin. If a certain torque is exceeded or if a load peak acts on the system, the adapter 44, the spring pin and/or the threaded spindle 14 can slide through against one another. In order to minimize the friction in the axial direction, an axial bearing can be provided on the threaded spindle 14. An axial securing can be realized via retaining washers, which are arranged between the adapter 44 and the threaded spindle 14.

The adapter 44 is held in a rotationally fixed manner on the rotor 17 in a frictional-locking, positive-locking and/or material-bonding manner.

FIG. 8a shows an overload clutch 13 inside the adapter 44 with spring plates that are not shown.

FIG. 8b shows an overload clutch 13 inside the adapter 44 with a spring pin 45. One side of the spring pin 45 is pressed into a receiving hole 46 of the adapter 44 and the opposite side of the spring pin 45 is pressed into a receiving hole 47 of a further adapter 48, which is connected to the threaded spindle 14 via a frictional-locking and/or positive-locking connection. Alternatively, a receiving hole can also be arranged in the threaded spindle 14. Then the further adapter 48 is not necessary.

Figure 8C:
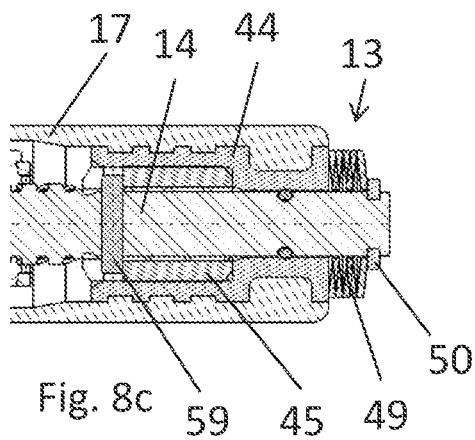

FIG. 8c shows an overload clutch 13 with an adapter 44. Here, the threaded spindle 14 protrudes out of the rotor 17 via the adapter 44. In the rear region, the threaded spindle 14 has a spring pin 45, which is arranged between the threaded spindle 14 and the adapter 44. The spring pin 45 is fixed in the axial direction by a pin 59, which protrudes through a drilled hole in the threaded spindle 14. The threaded spindle 14 is preloaded by a spring arrangement 49 and a reduction in play of the threaded spindle 14 or of the spring pin 45 is thereby effected in the axial direction. For this, a groove, in which an axial retaining element 50, in particular a retaining ring, is arranged, is arranged on the threaded spindle. The spring arrangement 49 is thus supported on the adapter 44 on one side and on the axial retaining element 50 on the opposite side. When the overload clutch 13 is released, the spring pin 45 and the adapter 44 can twist independently of one another.

Figure 8D:
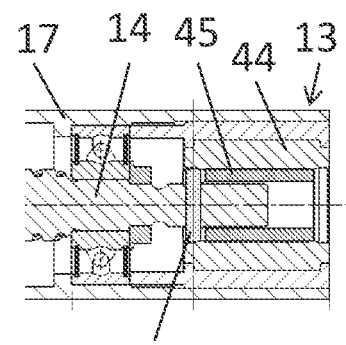

FIG. 8d shows an overload clutch 13 inside the adapter 44 with a spring pin 45. In the rear region, the threaded spindle 14 has a spring pin 45, which is arranged between the threaded spindle 14 and the adapter 44. The spring pin 45 is fixed in the axial direction by a pin 59, which protrudes through a drilled hole in the threaded spindle 14. As soon as the frictional force between the spring pin 45 and the adapter 44 is overcome, because a certain torque is exceeded or a load peak acts on the system, the threaded spindle 14 can rotate independently of the rotor 17.

Figure 8E:
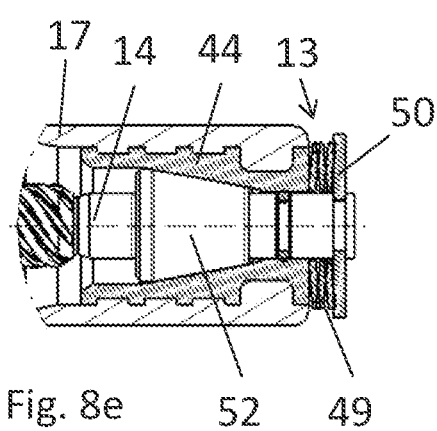

FIG. 8e shows an overload clutch 13 with an adapter 44, like FIG. 8c. In contrast to FIG. 8c, a cone 52 is arranged inside the adapter 44, wherein one end of the cone protrudes from the rotor 17 via the adapter 44. The cone 52 is preloaded by a spring arrangement 49 and thereby connected to the adapter 44 in a rotationally fixed manner. For this, a groove, in which an axial retaining element 50, in particular a retaining ring, is arranged, is arranged on the cone 52. The spring arrangement 49 is thus supported on the adapter 44 on one side and on the axial retaining element 50 on the opposite side. The releasing of the overload clutch 13 can be adapted through different spring constants of the spring arrangement 49 and/or different diameters of the cone and/or the tapering. The cone 52 can be connected to the threaded spindle 14 in a frictional-locking and/or positive-locking manner.

Figure 8F:
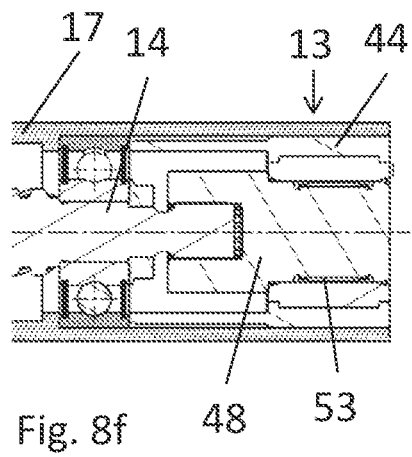

FIG. 8f shows an overload clutch 13 inside the adapter 44 with a tolerance ring 53 as overload clutch 13. The tolerance ring 53 is arranged between the adapter 44 and a further adapter 48. Alternatively, the tolerance ring 53 can be arranged between the adapter 44 and the threaded spindle 14. The further adapter 48 can thereby be dispensed with. The tolerance ring 53 connects the adapter 44 to the further adapter 48 or to the threaded spindle 14 and transmits a defined torque. As soon as the defined torque is exceeded, the tolerance ring 53 makes it possible for the adapter or the threaded spindle to twist relative to one another. The tolerance ring 53 preferably consists of an embossed metal strip, which is rolled to form an open sleeve and, for example, corrugations or fingers are moulded or imprinted along the outside and/or the inside. The tolerance ring 53 preferably has a lateral gap, which defines the preloading of the tolerance ring 53. The adapter 44 particularly preferably has a steel insert at least in the region of the tolerance ring 53. The adapter 44 can thereby be manufactured from a plastic, for example.

Figure 9:
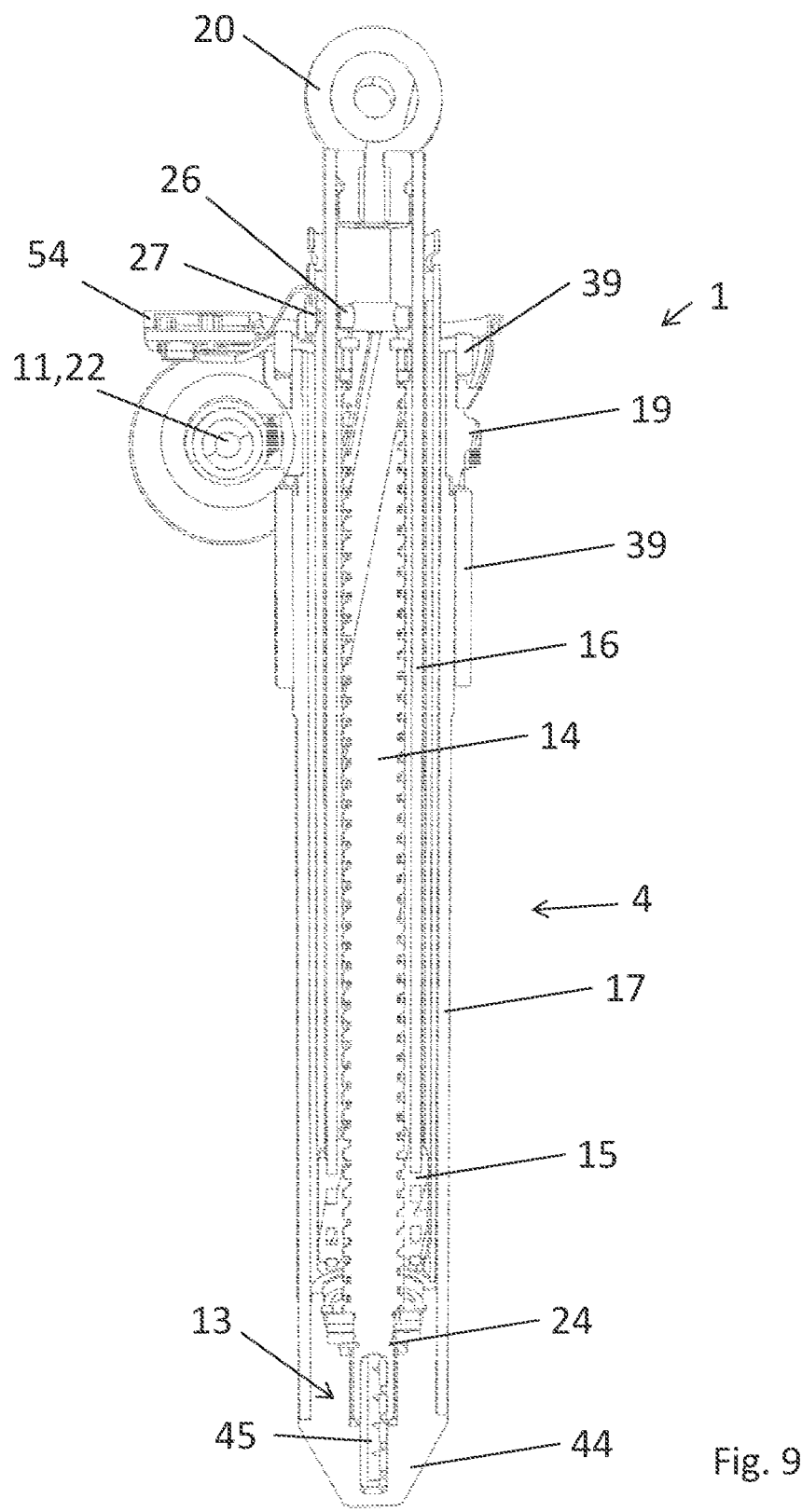
FIG. 9 is a cross-sectional view of the drive from FIG. 7.

FIG. 9 shows a cross section of the drive 1, according to FIG. 7, with a sensor 27 for determining the angle of rotation of the threaded spindle 14. The sensor 27 can be an incremental sensor 27 and the coding disc 26 or coding 26 can be a magnetic disc 26, which is connected to the threaded spindle 14 in a fixed or rotationally fixed manner. The sensor 27 is preferably fastened at a distance from the thrust tube 16 and connected to an electronic circuit 54, which is fastened on or in the housing 2. The connection between the sensor 27 and the electronic circuit 54 can be effected by cables or a flexible circuit board. The material of the thrust tube 16 is preferably not ferromagnetic, with the result that shielding of a magnetic field is not possible. The sensor 27 is preferably fastened on or in the housing 2. The sensor 27 can detect the change in polarity of the magnetic disc 26 and thus determine the angle of rotation of the threaded spindle 14.

Figure 10:
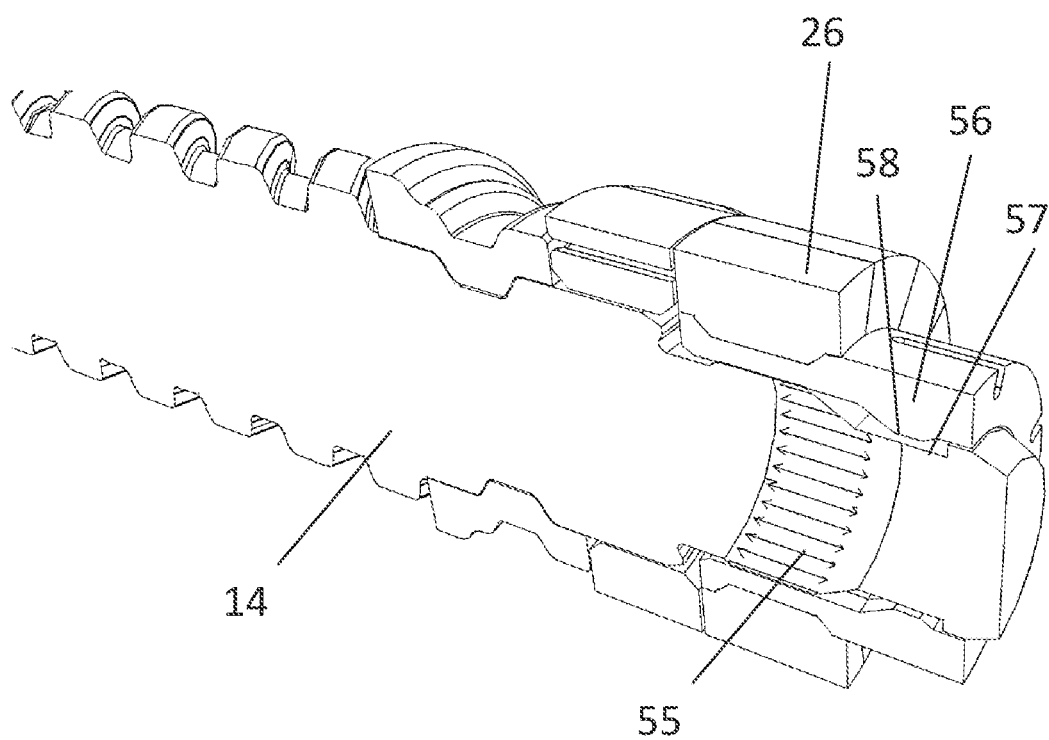
FIG. 10 is a part of a threaded spindle with a coding disc according to FIG. 9.

FIG. 10 shows a cross section of a part of the threaded spindle 14 and of the coding disc 26. In order to connect the coding disc 26 to the threaded spindle in a rotationally fixed manner, a fluting 55 is preferably arranged on the threaded spindle 14 at least in the region of the coding disc 26. The coding disc 26 can be connected to the threaded spindle 14 via a carrier 56. For this, the coding disc 26 is, for example, glued to the carrier 56 and then fastened to the threaded spindle 14, preferably in a frictional-locking and/or positive-locking manner. In order to prevent an axial displacement of the coding disc 26, a groove 57, in which a lug 58 of the carrier 56 engages, can be arranged on the threaded spindle and/or a retaining washer, which holds the carrier 56 and the coding disc 26 in position, can be arranged in front of the carrier 56.

REFERENCE NUMBERS

1 Drive
2 Housing
3 Motor
4 Spindle drive
5 Holder
6 Motor axis of rotation
7 Spindle drive axis of rotation
8 Holder first bearing point
9 Holder second bearing point
10 Pivot axis
11 First gear stage
12 Second gear stage
13 Overload clutch
14 Threaded spindle
15 Nut
16 Thrust tube
17 Rotor
18 Adapter
19 Rotor gear wheel/spur gear
20 Connecting point
21 Connecting point pivot axis
22 Shaft
24 Threaded spindle groove
25 Adapter pin
26 Coding disc
27 Sensor
28 Guide tube
29 Housing cover
30 Thrust tube openings
31 Holding extension
32 Bridge
33 Housing extension
34 First receiver
35 Second receiver
36 Connecting web
37 Holder cutout
38 Holder drilled holes
39 Rotor bearing
40 Hysteresis brake
41 Seal
42 Holder cutout centring device
43 Flange
44 Overload clutch adapter
45 Spring pin
46 Adapter receiving hole
47 Threaded spindle receiving hole
48 Threaded spindle adapter
49 Spring arrangement
50 Axial retaining element
52 Cone
53 Tolerance ring
54 Electronic circuit mounting
55 Tooth system
56 Coding disc carrier
57 Groove
58 Lug
59 Pin

The invention claimed is:

1. A drive for a flap, wherein the drive has a housing, a motor and a spindle drive, wherein the motor and the spindle drive are drivingly connected to one another and make a motorized adjustment of the flap possible, wherein the drive moves the flap at least into an open position and a closed position, wherein the spindle drive has a threaded spindle with a nut and a thrust tube and the thrust tube is connected to the threaded spindle via the nut, wherein the thrust tube is moved via a translational movement, wherein the spindle drive is arranged inside a rotor and the motor drives the rotor, wherein the rotor is connected to the threaded spindle, wherein the rotor surrounds the threaded spindle and the thrust tube radially.

2. The drive according to claim 1, wherein the rotor is connected to the threaded spindle via an adapter.

3. The drive according to claim 1, wherein the rotor has a hollow cylindrical geometry.

4. The drive according to claim 1, wherein at least one bearing is arranged between the housing and the rotor.

5. The drive according to claim 1, wherein a gear wheel is connected to the rotor.

6. The drive according to claim 1, wherein the spindle drive additionally has a guide tube, via which a torque support of the thrust tube is effected.

7. The drive according to claim 6, wherein the guide tube is connected to a housing cover.

8. The drive according to claim 1, wherein at one end of the thrust tube a connecting point is arranged, which is connected to a vehicle body, wherein the thrust tube and the connecting point are connected to one another.

9. The drive according to claim 8, wherein the connecting point is pivotable about a pivot axis.

10. The drive according to claim 9, wherein the pivot axis of the connecting point runs parallel to the axis of rotation of the motor.

11. The drive according to claim 1, wherein the drive is fastened to the flap via a holder.

12. The drive according to claim 11, wherein the housing is held in the holder via at least two bearing points.

13. The drive according to claim 11, wherein the holder has a U-shaped geometry in cross section.

14. The drive according to claim 1, wherein an axis of rotation of the motor and an axis of rotation of the spindle drive are arranged skewed relative to one another or have exactly one intersection.

15. The drive according to claim 1, wherein the drive is mounted pivotable about a pivot axis.

16. The drive according to claim 15, wherein the pivot axis runs parallel to the axis of rotation of the motor.

17. The drive according to claim 1, wherein arranged on the rotor there is a coding disc, which is scanned by a sensor arranged inside the housing.

18. The drive according to claim 1, wherein at least in each case one seal is arranged between the thrust tube and the housing and between the rotor and the housing.

19. The drive according to claim 1, wherein a sensor which detects a pivoting angle of the drive is arranged in immediate proximity to the drive or on the drive.

20. The drive according to claim 19, wherein a coding, which is scanned by the sensor and thereby detects a pivoting angle of the drive, is arranged on the drive.

21. A drive for a flap, wherein the drive has a housing, a motor and a spindle drive, wherein the motor and the spindle drive are drivingly connected to one another and make a motorized adjustment of the flap possible, wherein the drive moves the flap at least into an open position and a closed position, wherein the spindle drive has a threaded spindle with a nut and a thrust tube and the thrust tube is connected to the threaded spindle via the nut, wherein the thrust tube is moved via a translational movement, wherein the spindle drive is arranged inside a rotor and the motor drives the rotor, wherein the rotor is connected to the threaded spindle, wherein the drive is fastened to the flap via a holder, and wherein the housing is held in the holder via at least two bearing points.

22. The drive according to claim 21, wherein the rotor surrounds the threaded spindle and the thrust tube radially.

23. A drive for a flap, wherein the drive has a housing, a motor and a spindle drive, wherein the motor and the spindle drive are drivingly connected to one another and make a motorized adjustment of the flap possible, wherein the drive moves the flap at least into an open position and a closed position, wherein the spindle drive has a threaded spindle with a nut and a thrust tube and the thrust tube is connected to the threaded spindle via the nut, wherein the thrust tube is moved via a translational movement, wherein the spindle drive is arranged inside a rotor and the motor drives the rotor, wherein the rotor is connected to the threaded spindle, and wherein arranged on the rotor there is a coding disc, which is scanned by a sensor arranged inside the housing.

* * * * *